United States Patent
Ahlard et al.

(10) Patent No.: US 7,461,157 B2
(45) Date of Patent: Dec. 2, 2008

(54) DISTRIBUTED SERVER FUNCTIONALITY FOR EMULATED LAN

(75) Inventors: David Ahlard, Årsta (SE); Joakim Bergkvist, Solna (SE); Leif Byström, Hägersten (SE); Urban Hansson, Bandhagen (SE)

(73) Assignee: Hyglo Systems AB, Stockholm (SE)

( * ) Notice: Subject to any disclaimer, the term of this patent is extended or adjusted under 35 U.S.C. 154(b) by 377 days.

(21) Appl. No.: 10/481,978

(22) PCT Filed: Jun. 27, 2001

(86) PCT No.: PCT/SE01/01473

§ 371 (c)(1),
(2), (4) Date: Apr. 1, 2004

(87) PCT Pub. No.: WO03/003665

PCT Pub. Date: Jan. 9, 2003

(65) Prior Publication Data

US 2004/0205188 A1 Oct. 14, 2004

(51) Int. Cl.
*G06F 15/16* (2006.01)
*G06F 15/173* (2006.01)
*G06F 15/177* (2006.01)

(52) U.S. Cl. .................. 709/228; 709/238; 709/220
(58) Field of Classification Search ......... 709/217–230, 709/238
See application file for complete search history.

(56) References Cited

U.S. PATENT DOCUMENTS

| | | | | | |
|---|---|---|---|---|---|
| 5,805,805 | A | * | 9/1998 | Civanlar et al. | 709/220 |
| 6,006,259 | A | * | 12/1999 | Adelman et al. | 709/223 |
| 6,041,166 | A | * | 3/2000 | Hart et al. | 709/238 |
| 6,047,325 | A | * | 4/2000 | Jain et al. | 709/227 |
| 6,147,995 | A | * | 11/2000 | Dobbins et al. | 370/392 |
| 6,189,041 | B1 | * | 2/2001 | Cox et al. | 709/238 |
| 6,480,900 | B1 | * | 11/2002 | Habert | 709/245 |
| 6,587,467 | B1 | * | 7/2003 | Morgenstern et al. | 370/399 |
| 6,772,226 | B1 | * | 8/2004 | Bommareddy et al. | 709/245 |
| 2002/0147771 | A1 | * | 10/2002 | Traversat et al. | 709/203 |
| 2003/0046390 | A1 | * | 3/2003 | Ball et al. | 709/224 |

\* cited by examiner

*Primary Examiner*—Haresh N Patel
(74) *Attorney, Agent, or Firm*—Ladas & Parry LLP

(57) ABSTRACT

A system for emulating a local network on top of a global communication network that includes Local Area Network (LAN) LAN Emulating clients units (LEC) and a LAN Emulating server (LES) which are connected to the global network, and a Broadcast and Unknown Server (BUS) functionality for relaying messages to all clients in the emulated local area network. The system is characterized in that the broadcast functionality is distributed and implemented in more than one network unit node in the emulated local area network. The global network is preferably an IP network, such as the Internet, and act as a backbone for the emulated local area network.

15 Claims, 3 Drawing Sheets

US 7,461,157 B2

DISTRIBUTED SERVER FUNCTIONALITY FOR EMULATED LAN

CROSS-REFERENCES TO RELATED APPLICATIONS

This application claims the priority of PCT/SE01/01473 dated Jun. 27, 2001 under 35 U.S.C. 371.

FIELD IF THE INVENTION

The invention relates in general to computer networks and more in particular to enabling mechanisms for delegation and distribution of centralised network server functions to the edge of computer networks. Specifically, the invention relates to distributed broadcast server functionality used for emulated local area networks (LAN) on global networks.

BACKGROUND

Most enterprises are located at multiple sites where each site has its own local area network (LAN). A site is defined as anything from a head-quarter, or an affiliation company site, to a single employee's remote office site. Some kind of communication infrastructure is then used to interconnect the different sites. The Internet evolution can roughly be categorised into two main areas:

a) Internet as the global communication infrastructure. Traditionally, companies used so called leased lines, provided by telephone companies to interconnect their sites. Separated firewall solutions were used for accessing the Internet. During the last years, companies are no longer using Internet only for external communication, more and more companies are trying out new network solutions that enables them to also use Internet for company-internal communication. Internet has become their site-to-site interconnecting medium.

b) Broadband Internet access. In parallel with the above, more and more broadband access solutions are rolled out by different network access providers. This enables anyone to upgrade their access to Internet from a traditional dial-up PSTN/ISDN (Public Switched Telephone Network/Integrated Services Digital Network) access solution to a broadband solution, e.g. ADSL (Asymmetric Digital Subscriber Line), Cable or Ethernet, with direct access to Internet. Apart from the obvious broadband benefits, the network access user is also able to always be connected to the Internet.

The common name for most of the network solutions that interconnects multiple sites over Internet is "virtual private networks" (VPN). VPNs can be implemented in numerous ways, this is well explained in e.g. the IETF by B. Gleeson et. al, "A Framework for IP Based Virtual private Networks", RFC 2764, February 2000, IP meaning Internet Protocol. A VPN is a private network that is configured within a public network For years, common carriers have built VPNs that appear as private national or international networks to the customer, but physically share backbone trunks with other customers. VPNs enjoy the security of a private network via access control and encryption, while taking advantage of the economies of scale and built-in management facilities of large public networks. Today, there is tremendous interest in VPNs over the Internet, especially due to the constant threat of hacker attacks. The VPN adds that extra layer of security, and a e huge growth in VPN use is expected. In general, the different VPN solutions can be categorized into two main groups; customer premises equipment (CPE) based solutions or network based solutions.

Internet is a public data network based on network paradigms such as equal and best effort traffic treatment. All traffic crossing the Internet is public and insecure resulting in a number of problems that need to be solved, e.g. end-to-end security communication between enterprise sites. Some problems have solutions supported by several VPN system vendors, such as encrypted IP tunnelling between end-users using the IPSec architecture described by S. Kent and R. Atkinson in "Security Architecture for the Internet Protocol", RFC 2401, November 1998, or stand-alone firewall solutions, desktop software VPN clients. e.g. Microsoft® VPN, etc. A PC that is connected to Internet can, not easily but it is possible, be used as a transit node by a hacker, e.g. the hacker could use a Trojan horse program to get inside the PC. Well inside, the Trojan horse program may be adapted to release application software that will act as some authenticated software installed by the owner of the PC. It is very difficult for layer 2 and 3 firmware/software to detect this kind of malicious applications. Therefore, it is recommendable to have VPN control and management software and firmware functions and end-user applications, such as service login software, "authenticated" software applications that in some way uses the network infrastructure provided by the VPN service, separated on different hardware platforms. What generally should C be avoided, is having PC clients that are responsible for configuring the actual VPN setup, i.e. having access to the lookup-table for other VPN members public IP addresses, having access to information on how to authenticate, perform integrity C check and encrypt traffic aimed for the VPN etc.

When a Virtual Private Network (VPN) is implemented as an emulated LAN on top of a standard IP network such as Internet, one have to provide for the broadcast functionality that is a basic (intrinsic) function on a level-2 media such as Ethernet A number of broadcast based services are defined on the link-level. Examples are service discovery protocols and the layer-2 Address Resolution Protocol (ARP). The broadcast functionality could be implemented in different ways. Examples of different architectures are:

Broadcast functionality implemented as a centralized server;
Broadcast functionality implemented using IP multicast;
Broadcast functionality implemented using emulated multicast.

ATM Forum's LANE (LAN Emulation) standard is an example of centralised server architecture. This server emulates the broadcast functionality on the LAN. When a LAN Emulating Client (LEC) sends a broadcast, the broadcast is sent to the BUS (Broadcast and Unknown Server) that relays this message to all of the other clients on the emulated LAN.

The technical problems with the described architecture are related to scalability and reliability. When a large number of LAN emulating clients are sending broadcasts to the broadcast server each client will experience a performance degradation of the broadcast service due to the load on the broadcast server. The traffic load on the link connecting the broadcast server will also increase with a large number of LAN clients. This will ultimately becomes a bottleneck. This bottleneck will further reduce the broadcast performance experienced by the LAN clients. In addition to the performance problem, a single broadcast server will also be a single point of failure for broadcast based services offered by the emulated LAN.

When the broadcast functionality is implemented by using IP multicast, the LAN emulating clients joins a multicast network. This network constitutes the broadcast medium for the emulated LAN. Obviously, to be able to use IP multicast as the broadcast medium, the clients have to interact with a multicast service offered by underlying IP network. This interaction could be done via a LAN emulating server, the management system of the emulated LAN or by other means. A technical problem with this solution is the dependency of the IP multicast functionality in the IP backbone and the need for the emulated LAN to interact with IP backbone.

SUMMARY OF THE INVENTION

According to first aspect of the invention, a system for emulating a local area network on top of a global communication network is provided. The system comprises clients units and a server which are connected to said global network. Furthermore, the system comprises a broadcast functionality for relaying messages to all clients in the emulated local area network. According to the invention said broadcast functionality is distributed and implemented in more than one network unit node in the emulated local area network. Said global network preferably acts as a backbone for the emulated local area network.

In one embodiment a choice of which clients unit has an up and running broadcast functionality unit is defined by the server, and is based on predetermined performance criteria, such as available bandwidth to the backbone network.

Preferably the distributed broadcast functionality is hierarchically structured, wherein a master and initial broadcast functionality unit, constituting the top of said hierarchy, is configured in said server.

In one embodiment the connections between the nodes of the emulated local area network are implemented as a multicast network transmitted through the global network. In another embodiment the connections between the nodes of the emulated local-area network may is implemented as single-cast addresses, forming tunnels through said global network.

Preferably each network unit having a distributed broadcasting functionality comprises means for executing an algorithm for preventing broadcast messages from being indefinitely sent between the network unit nodes having the distributed broadcasting functionality. In one embodiment this is arranged by an algorithm being based on a checksum of the broadcast packet, which checksum uniquely identifies the broadcast packet. The checksum is cached by the broadcasting functionality for the purpose of dropping subsequently arriving broadcast packets having the same checksum. In another embodiment another algorithm is used, based on a hop counter which is decremented by each broadcasting functionality unit upon arrival, said algorithm functioning to drop subsequent incoming packets when the counter has reached zero.

Preferably said global network is an Internet Protocol network such as the Internet.

According to a second aspect of the invention, a method is provided for taking the steps described in this application, for emulating a distributed local area network.

BRIEF DESCRIPTION OF THE DRAWINGS

Preferred embodiments of the invention are described below with references being made to the drawings, on which

DETAILED DESCRIPTION OF PREFERRED EMBODIMENTS

According to one aspect, the system according to the present invention is based on a standard IP network like the public Internet. The system comprises multiple VPN clients and at least one server. One server can be a distributed cluster of physical boxes. The VPN clients could be implemented as drivers on the client computer but are for security reasons preferably implemented in a stand alone hardware box. A purpose of this mechanism is to establish dynamic and secure Virtual Local area Networks between some or all of the clients. A virtual-network is created by establishing connection groups in a VPN server. The server has a service device for keeping track of connected machines and mapping them to IP addresses. In one embodiment this is obtained using ARP (Address Resolution Protocol), an IP protocol used to obtain a node's physical address. A client station sends an ARP request to the VPN server with the VPN internal IP address of the target node it wishes to communicate with, and the VPN server responds by sending back the external IP address so that packets can be transmitted. ARP returns the layer-2 address for a layer-3 address. This mechanism also handles distribution of public keys to form complete security associations. For handling broadcasts an emulated broadcast service is implemented in the server, preferably using an IP multicast group or as a separate broadcast service. Data sent directly from one machine in the virtual network to another is tunnelled over IP directly to the IP address of the receiving client. The mechanism includes both the case where data packets are tunnelled directly over IP and when an layer-2 media such as Ethernet is bridged onto the IP network.

Figure 5:
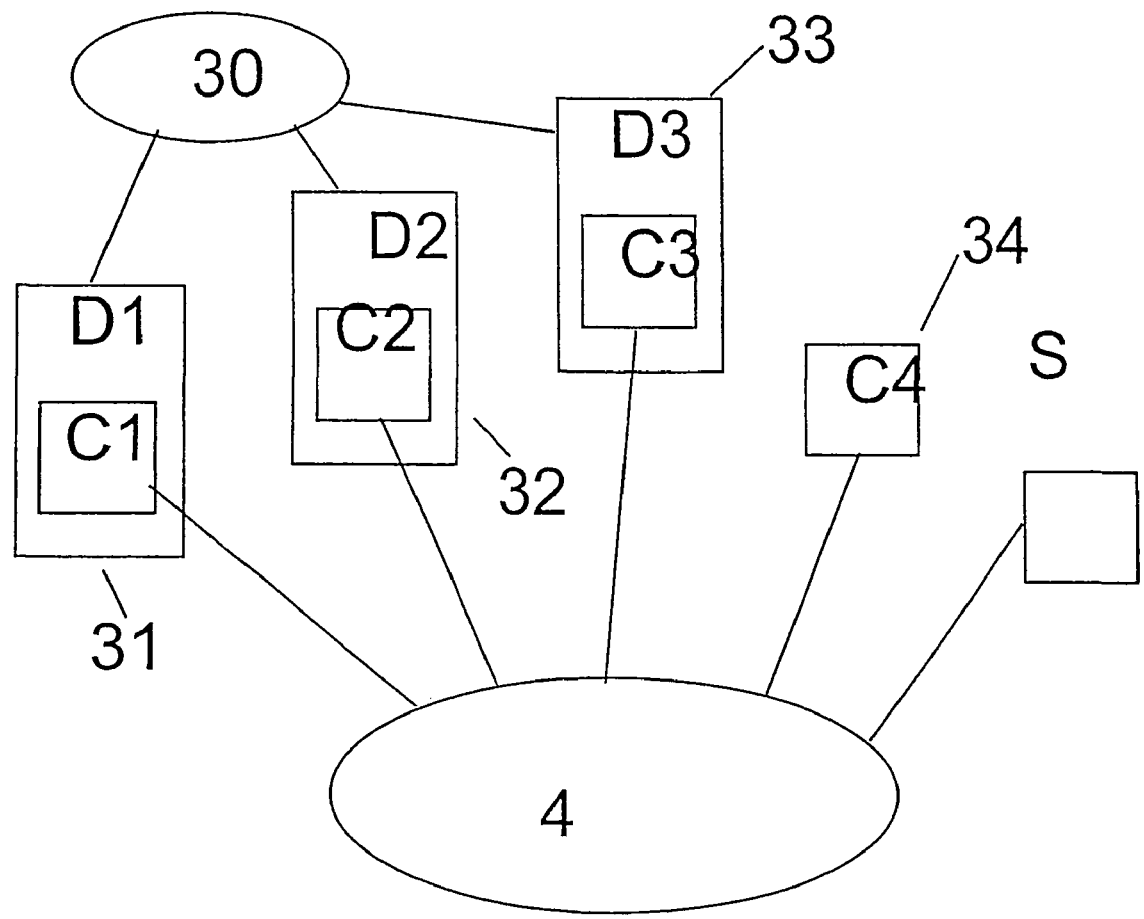
FIG. 5 illustrates an emulated LAN on top of a global IP network, according to an embodiment of the invention.

FIG. 5 illustrates an embodiment of the system according to the present mechanism, wherein a network 4 comprises five nodes; four VPN clients 31-34 with global addresses C1-C4, and a server S. All of these are connected to and have a valid address in the physical network 4. These nodes are interconnected using standard Internet routing procedures, but the clients 31-34 are not on the same LAN. On top of this network infrastructure, clients 31, 32 and 33 form a virtual network 30 with local addresses D1, D2 and D3. In the illustrated case the C3 clients in this VPN appear to be on the same local area network. The reason for this is the broadcast service, i.e. the service device, which delivers all packets for the local broadcast domain to all machines on the VPN 30. Thus service discovery mechanisms or layer-2 ARP operate transparently on top of the virtual network. When client 31 on the VPN wants to transmit a packet directly to client 32 the client-software requests the physical address C2 from server S, based upon the local address D2, and possible security keys required for talking to D2 from S. D1 is then able to transmit the packet in a secure tunnel directly to D2 without passing the server S.

The above provides an effective and user friendly mechanism for establishing Virtual Private Networks over generic IP connections. Broadcast services and service discovery protocols that normally require a direct layer-2 interconnection may work independently of the actual network structure. It also provides the possibilities of distributed network broadcast handling, where rules and configuration options may be cached in the end nodes of the network instead of in a centralised server. The described mechanism is unique in that it presents a complete distributed emulated LAN on top of an IP network where access and attributes such as security associations are completely controlled by a server. Most current solutions uses static tunnels. Either permanent connections are set up between the members of the VPN or tunnel servers which basically works as modem pools only you "dial" an IP number. This means that all traffic no matter it's final destination goes through this one box. In particular traffic going to sites in the VLAN (Virtual LAN) other than that of the VLAN server comes in through the server access and turns. The broadcast service allows service discovery protocols designed for local networks to function on the VPN while the ARP mechanism allows for dynamic establishment of secure tunnels directly between endpoints. The well known LANE (LAN Emulation) standard was focused entirely on ATM (Asynchronous Transfer Mode) and featured nonintegrated security handling. Lane introduces, inter alia, the ability to connect Ethernet and Token Ring networks together via ATM. LANE makes the process transparent, requiring no modification to Ethernet and Token Ring stations. LANE allows common protocols, such as IP, IPX, AppleTalk and DECnet, to ride over an ATM backbone. LAN emulation has been implemented and verified over ATM. However, since the system architecture itself by design avoids sending all data through the server, the bottleneck problem with overloaded server links is completely avoided.

Figure 1:
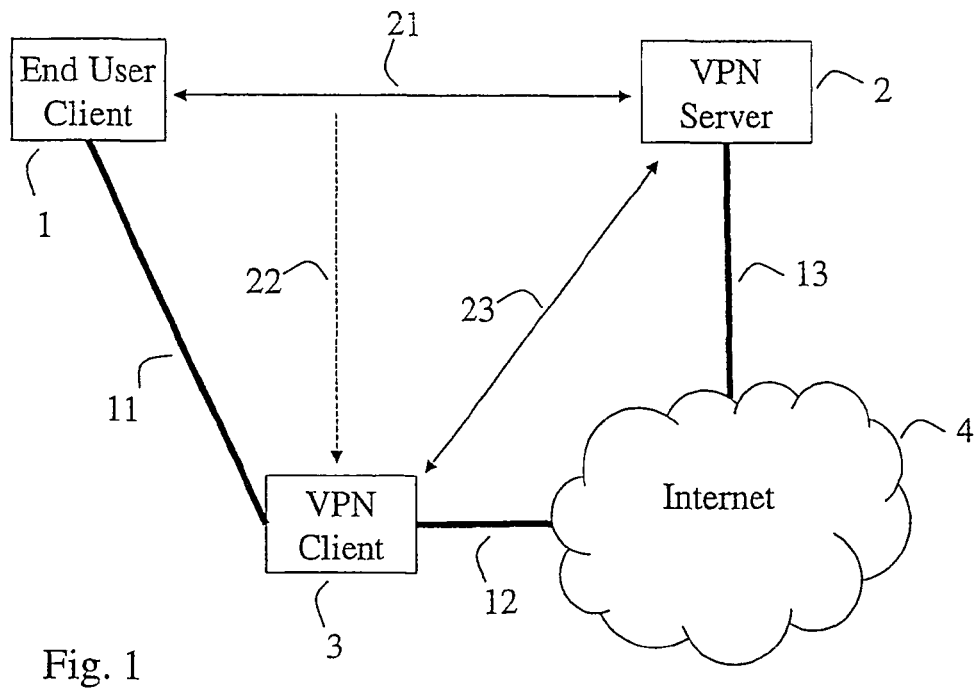
FIG. 1 illustrates the system overview according to an embodiment of the present invention.

In general, the target system relies on a decision scheme for a third-party overtaking of a client role in a two-party communication session. Turning to FIG. 1, the system processes comprises end user clients located at the end user premises equipment 1, a central VPN system server 2, and network edge located VPN system clients 3. Full lines indicate physical communication lines, whereas arrows indicate communicating ends, without specifying which route the communication takes between those communicating ends.

The end user client process preferably resides in a PC, the VPN client process preferably resides within a standalone hardware unit, and the VPN server process resides within any kind of server hardware unit, such as an IBM® server. By process is here meant the functionality for the particular client or server, as described herein. The VPN server 2 and the VPN client 3 are parts of a VPN system that provides the end user client 1 with access to required VPNs. The end user client 1 hardware is physically connected via a communication line 11 to the VPN client 3 hardware. The VPN client 3 hardware is physically connected to a layer-two termination that enables the VPN client 3 to access Internet over a communication line 12. The layer-two protocol is preferably Ethernet but could practically be any known layer-two protocol used for the encapsulation and transport of IP (Internet Protocol) packets between IP nodes. The VPN server 2 is connected to Internet via a communication line 13 in the same way as the VPN client 3.

According to an embodiment of the target system the end user client 1 initiates a communication session with the VPN server 2 in order to acquire access to a virtual private network. During the initialisation phase, the VPN server 2 authenticates and authorises the end user client 1 as a registered user of VPN services that are provided by the VPN server 2. The VPN client 3 is passive in that it does not initiate any new information elements during the initialisation phase. The VPN client 3 also monitors 22 the communication 21 between the end user client 1 and the VPN server 2.

When the initialisation phase between the end user client 1 and the VPN server 2 is finished, and when information has been exchanged, regarding particular VPN that the end user clients request access to, then the VPN client 3 becomes active and takes over the communication session between the end user client 1 and the VPN client 3. The VPN client 3 now requests, if it is necessary because the VPN information can already be cached by the VPN client 3, VPN configuration data from the VPN server 2. The VPN client 3 uses the configuration data to configure necessary VPN access parameters such as traffic classification parameters, performance assurance parameters, or firewall parameters such as encryption, authentication, filtering parameters, etc.

The end user client 1 is allowed to use different VPN servers 2 but cannot have simultaneous access to more than one VPN server 2. The VPN client 3 detects when an end user client 1 tries to access a certain server 2. At this moment the VPN server 2 is considered insecure until the end user client 1 has authenticated the VPN server 2 and also have been authenticated by the VPN server 2.

Figure 2:
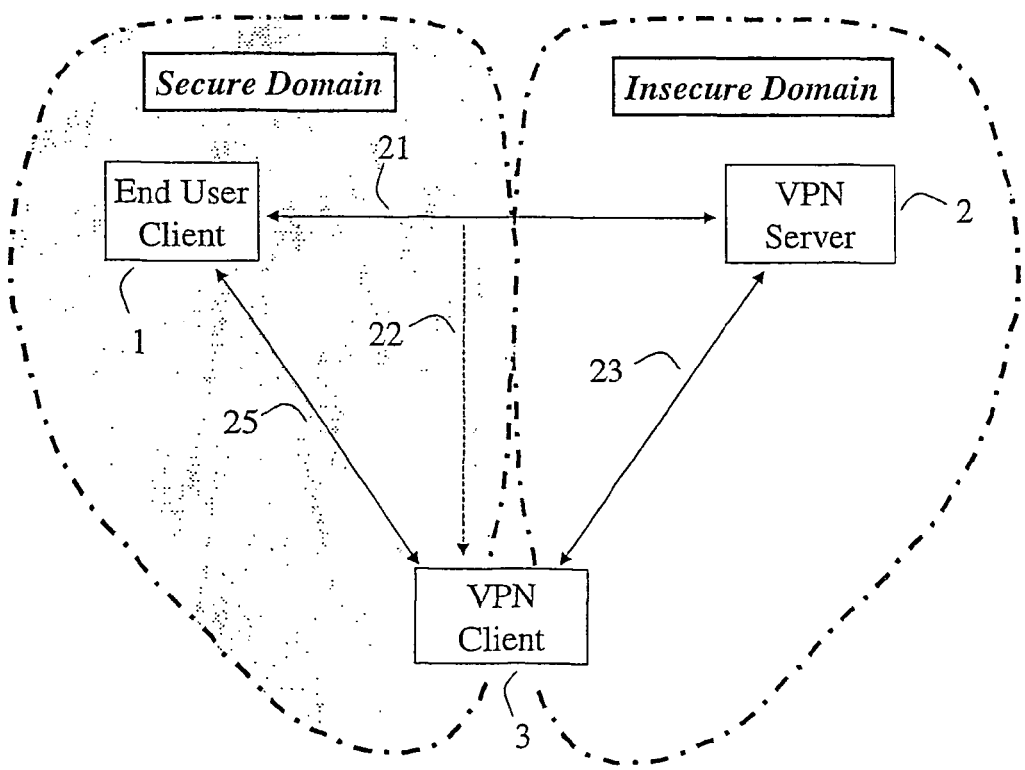
FIG. 2 illustrates traffic monitoring and session overtaking according to an embodiment of the present invention.

The monitoring and session overtaking scenarios are described more in detail in FIG. 2. The VPN client 3 has one trusted domain, which is the end user client 1 side, and one distrusted domain, the Internet domain. From the VPN client's 3 point of view, the VPN server 2 is therefore located in the distrusted domain. Since all in- and outgoing IP traffic to/from the end user client passes through the VPN client 3 hardware, the VPN client 3 is able to monitor the communication 21 between the end user client 1 and the VPN server 2. This is true if, and only if, the IP traffic not is encrypted in such a way that the VPN client 3 is unable to decrypt the IP traffic. The VPN client 3 software resides on hardware that physically interconnects the end user client 1 with Internet 4. The VPN client 3 is therefore able to monitor 22 all traffic 21 between the end user client 1 and different VPN servers 2 to whom the end user client 1 are registered as user.

The VPN client 3 identifies when the end user client 1 starts to establish contact with a VPN server 2. The VPN client 3 treats the end user client 1 side as a trusted party and the VPN server 2 as a distrusted party. The session establishment phase 21 between the end user client 1 and the VPN server 2 could be done in numerous ways, e.g. by a traditional challenge/response handshaking sequence. The communication 21 is primarily meant to be done by web based clients but other client/server process environment solutions are possible. When the handshaking sequence between the end user client 1 and the VPN server 2 has finished, the VPN client 3 takes over the communication session. The handshaking is considered finished when the VPN server 2 has authenticated and authorised the end user client 1, and acknowledged the end user client 1 as a confirmed user. The VPN client 3 will from now on undertake proxy roles towards both the end user client 1 and the VPN server 2. Towards the end user client 1, the VPN client 3 will act as a VPN server proxy, and towards the VPN server 2 as an end user client proxy. The end C user client 1 will continue it's session in belief that it still communicates with the VPN server 2. The VPN client 3 will, using the VPN server proxy role, continue the VPN setup session with the end user client 1.

Further on, the VPN client 3 is now considering the VPN server 2 as a secure source and starts up communication sessions 23 with the VPN server 2 that enables the end user client 1 to be included as members in the requested VPN.

In one embodiment the target system is implemented in a service provisioning system, where parts of the service functionality are distributed to system clients acting as server proxies. One technical advantages of the present system is that any hacker intrusions via an end user PC 1 are avoided by having critical software/firmware for control and management of VPN configuration data separated on standalone hardware 3. Another advantage is the automated overtaking of certified sessions. Another benefit is the plug-and-play behaviour for virtual services over Internet, which is made available through the system. The teachings of the present system thus differs from prior art technology, since earlier solutions to the problem have either been centralised server solutions, such as PSTN/ISDN modem-pool solutions, server centralised IP Sec tunnelling etc, or distributed solutions, which are only valid within one network operator intra-domain or within federated network operator domains. These solutions are generally referred to as network based VPN systems. The present system will function independently of whether or not the different VPN client users access the same network operator domain or a federated network domain or have access to totally independent network operator domains.

An emulated multicast comprises one or preferably several broadcast servers connected to the emulated LAN. The connection between the LAN emulating client LEC, herein also referred to as the VPN client, and the broadcast servers can be realised as tunnels or by other means. The broadcast servers can be configured dynamically by a LAN Emulating Server (LES) or in a static fashion via a management system.

Figure 3:
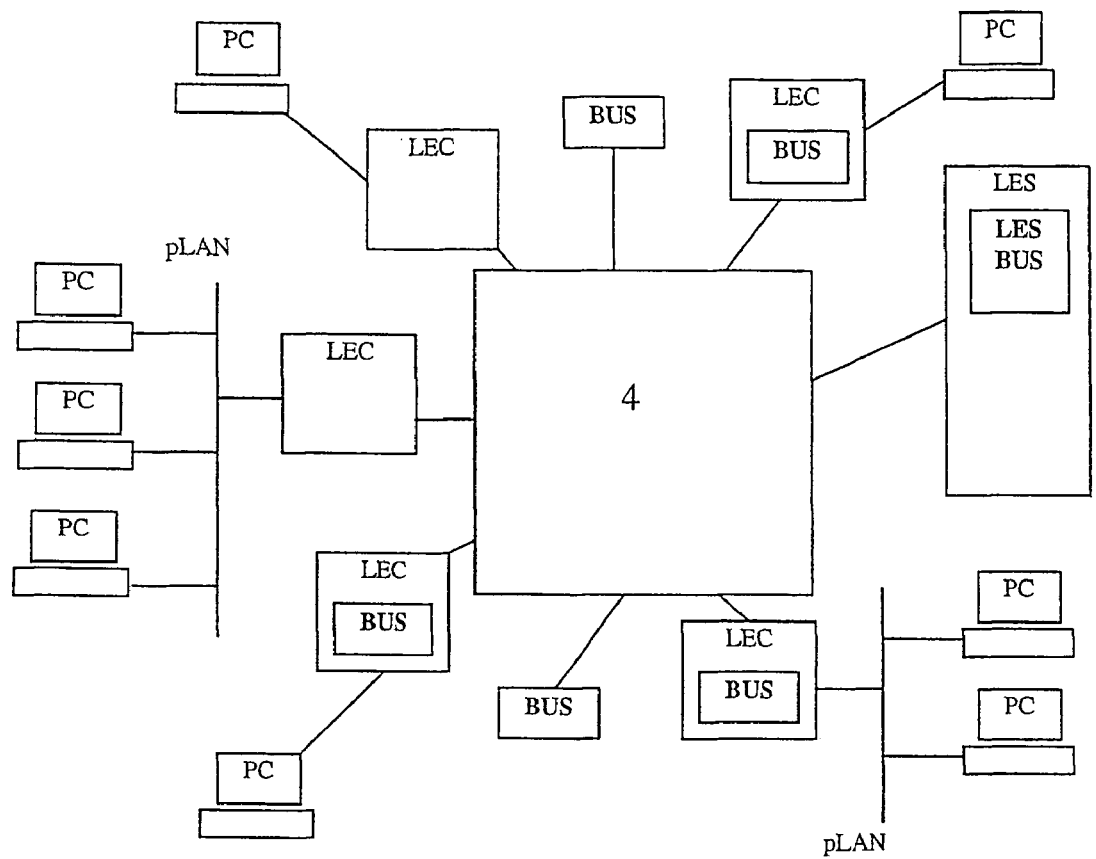
FIG. 3 Illustrates a distributed broadcasting functionality based on a global network backbone, according to an embodiment of the invention.

In one embodiment of the present invention, illustrated in FIG. 3, the system comprises a distributed architecture of broadcast servers on an emulated LAN. The LAN is emulated on top of a standard IP network like the Internet. That is, the IP network acts as a backbone for the emulated LAN. In FIG. 3, pLAN stands for physical LAN, as opposed to a virtual LAN. PC indicates, in this embodiment, an ordinary personal computer, but may just as well be some other type of data communication device. The emulated LAN is implemented on top of a standard global network, preferably an IP network, such as the Internet and functions to extend the physical LAN seen on the left hand side of FIG. 3 to other, and distant locations, such as the pLAN in the right hand side of FIG. 3, or the other PCs. The emulated LAN comprises connections between the LAN Emulating Clients (LECs). A LEC is implemented as a separate physical unit and acts as a bridge between the pLAN and the emulated LAN node. A LAN Emulating Server (LES) performs the management of the emulated LAN and the connected LECs.

The Broadcast and Unknown Server (BUS) functionality could be implemented in the LEC, as a separate unit connected to the IP network, and/or implemented in the LES. Different configurations are shown in FIG. 3. If the BUS is implemented in the LECs, the function lay dormant in most of the LECs and in function in some. Some, but not all of the LECs have a running BUS functionality. The choice of which LEC that has an up and running BUS is defined by the LES and based on different performance criteria such as available bandwidth to the IP backbone and/or the number of units connected to the pLAN etc.

Figure 4:
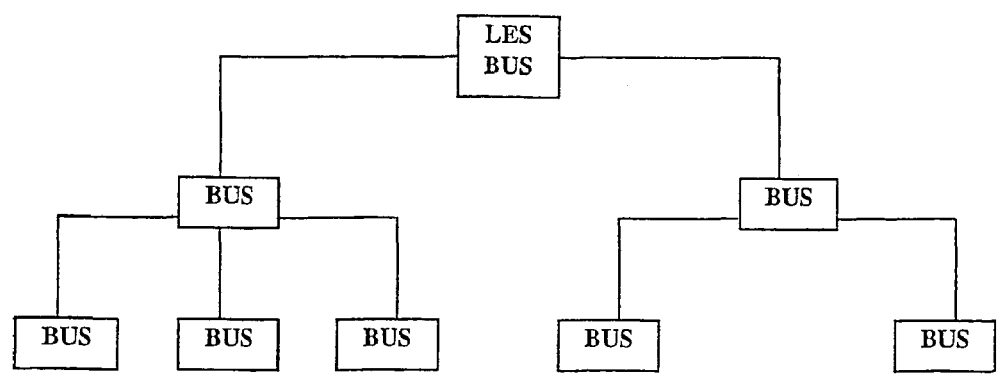
FIG. 4 illustrates the hierarchical configuration of the broadcasting functionality according to an embodiment of the invention.

The BUSes are preferably arranged in a logical hierarchical architecture as shown in FIG. 4. By using a hierarchical or tree structure the efficiency is enhanced. The master and initial BUS, the LES BUS, is configured in the LES. By using several BUSes the load on the system implementing the broadcast functionality will be shared. Further, the distributed architecture will give a load sharing on the links connecting the BUSes. As a consequence of the distributed architecture there is no single point of failure for the broadcast functionality. When a LEC connects to an emulated LAN the LEC receives information from the LES about the available BUSes. The LES may at this stage configure the connecting LEC to start its BUS functionality. The connections between the LEC and the BUSes, forming the nodes of the emulated local area network, may be implemented as a multicast network or as single-cast addresses, i.e. tunnels, to each of the other LECs.

Each BUS will have an algorithm in order to exclude the possibility of a "broadcast storm" where broadcast messages indefinitely are sent between the BUSes. The algorithm could be based on a checksum of the broadcast packet. This checksum will uniquely identify the broadcast packet and is cached by the BUS. If another broadcast packet arrives with the same checksum the packet will be dropped and not forwarded. In an alternative embodiment another algorithm is used, based on a hop counter, similar the Time To Live (TTL) parameter used in IP networks. The counter will be decremented by each BUS. When the counter reaches zero the packet will be dropped and not forwarded.

The invention according to this description may hence be used in a VPN based on an emulated LAN on top of IP network. The invention according to the description also differs from earlier known technology, since existing VPN solutions use a single broadcast server, and a technical advantage is that it enhances the scalability of VPN implementations.

The invention claimed is:

1. A system for emulating a local area network connected to a global communication network, acting as a backbone network comprising clients units and a server which are connected to said global network, and a broadcast functionality (BUS) for relaying messages to all clients in the emulated local area network, wherein said BUS functionality is distributed and implemented in more than one network unit node in the emulated local area network, wherein said system also is used for establishment of one or several Virtual Private Network (VPN) connections, the system comprising an end user client device and a VPN access server communicatively connected to the end user client via said global network, wherein a standalone VPN client device is interconnecting the end user client with said global network, wherein said VPN client comprising monitoring means for monitoring all traffic between the end user client and the VPN server;

wherein said monitoring means are devised to detect when a handshake agreement is established between the end user client and the VPN server;

wherein said monitoring means are devised to determine said handshake agreement for the initialisation phase of said VPN access acquiring session as completed upon detecting that said server acknowledges said end user client as a confirmed user; and wherein said VPN client is devised to request, upon detection of a completed handshake and execution of said VPN setup session overtake, said server to distribute VPN configuring data relevant for the inclusion of said end user client into said virtual private network.

2. The system as recited in ciaim 1, wherein a master and initial broadcast functionality unit is configured in said server.

3. The system as recited in claim 1, wherein the connections between the nodes of the emulated local area network are implemented as a multicast network transmitted through the global network.

4. The system as recited in claim 1, wherein the connections between the nodes of the emulated local area network are implemented as single-cast addresses, forming tunnels through said global network.

5. The system as recited in claim 1, wherein each network unit having a distributed broadcasting functionality comprises means for executing an algorithm for preventing broadcast messages from being indefinitely sent between the network unit nodes having the distributed broadcasting functionality.

6. The system as recited in claim 5, wherein said algorithm is based on a checksum of the broadcast message, which checksum uniquely identifies the broadcast packet and is cached by the broadcasting functionality for the purpose of dropping subsequently arriving broadcast packets having the same checksum.

7. The system as recited in claim 5, wherein said algorithm is based on a hop counter which is decremented by each broadcasting functionality unit upon arrival, said algorithm functioning to drop subsequent incoming packets when the counter has reached zero.

8. The system as recited in claim 1, wherein an example of is an Internet Protocol network.

9. The system as recited in claim 1, wherein said end user client comprising initiating means for initiating a communication session with the VPN server in order to acquire access to a VPN provided by the VPN server.

10. The system as recited in claim 1, wherein said VPN client is devised to act passive, and act as a third-party with regards to the two-party communication session between said end user client and said VPN server.

11. The system as recited in claim 1, wherein said VPN client comprises session overtaking means, devised to overtake a VPN access acquiring session for said end user client upon detection of said handshake agreement.

12. The system as recited in claim 1, wherein the end unit client side of the VPN client is defined as a secure domain, and the Internet and server side of the VPN client is defined as an insecure domain, said VPN client being devised only to accept a request for a VPN session access acquirement when initialized from said secure domain.

13. The system as recited in claim 1, wherein said VPN client is devised to form during the said overtaken VPN set-up session, secure associations between the VPN client and said VPN server by distributing one or many security keys/credentials to the VPN server, e.g. a public key specific for the VPN client itself, and receiving the. VP.N configuration data in forms of one or many security keys/credentials from the VPN server, e.g. a public key specific for the VPN server.

14. The system as recited in claim 1, wherein said VPN cleint is devised to undertake a proxy roll, comprising means for acting as a VPN server proxy towards the end user cleint, and means for acting as an end user client proxy towards the VPN server.

15. The system as recited in claim 1, wherein said server initially is configured with predetermined performance criteria, and wherein said server defines which clients units has an up and running BUS functionality based on predetermined performance criteria.

* * * * *